United States Patent [19]
Johnson

[11] Patent Number: 5,161,866
[45] Date of Patent: * Nov. 10, 1992

[54] IDLER WHEEL ASSEMBLY

[75] Inventor: Clifton E. Johnson, Red Lake Falls, Minn.

[73] Assignee: Power Equipment Corporation, Osseo, Minn.

[*] Notice: The portion of the term of this patent subsequent to Jul. 21, 2009 has been disclaimed.

[21] Appl. No.: 661,698

[22] Filed: Feb. 28, 1991

[51] Int. Cl.⁵ .............................................. B62D 55/14
[52] U.S. Cl. ................................. 305/24; 305/35 EB; 305/56
[58] Field of Search ......................... 305/21, 23, 24, 25, 305/28, 35 R, 35 EB, 38, 39, 56, 57

[56] References Cited

U.S. PATENT DOCUMENTS

| | | | |
|---|---|---|---|
| 2,537,745 | 1/1951 | Daniels | 305/38 X |
| 3,869,931 | 3/1975 | Boggs | 305/28 X |
| 4,948,201 | 8/1990 | Furuta | 305/56 |

FOREIGN PATENT DOCUMENTS

| | | | |
|---|---|---|---|
| 0124444 | 9/1979 | Japan | 305/38 |
| 0087671 | 7/1980 | Japan | 305/35 EB |
| 0154369 | 11/1981 | Japan | 305/35 EB |
| 0095271 | 6/1982 | Japan | 305/35 EB |
| 0203485 | 8/1988 | Japan | 305/39 |

*Primary Examiner*—Russell D. Stormer
*Attorney, Agent, or Firm*—Jerold M. Forsberg

[57] ABSTRACT

An idler wheel assembly includes a resilient tire and a rim for supporting the tire and for attaching the assembly to an axle. The resilient tire includes a centrally disposed rib with guide grooves on either side thereof disposed between the rib and load supporting surfaces. The rim includes an inner cylinder adapted to mount the assembly on an axle and an outer cylinder maintained in spaced relation to the inner cylinder by spacers. Clamping plates are part of the rim and cooperate with rigid spacer sleeves disposed in bores in the resilient tire to prevent compression of the tire wherein resiliency of the tire is lost. The rib is of a slightly larger diameter than the portion of the tire defined by the load supporting surfaces and cooperates with apertures in an endless belt tensioned therearound to self-center the assembly relative to the belt. The guide grooves cooperate with protrusions on the inside of the endless belt to maintain the alignment of the idler wheel assembly relative to the endless belt under conditions of extreme lateral stress.

19 Claims, 3 Drawing Sheets

IDLER WHEEL ASSEMBLY

BACKGROUND OF THE INVENTION

This application is copending with my other applications entitled "Drive System for a Track Type Vehicle" and "Drive Wheel Assembly".

The present invention relates generally to an idler wheel assembly, and more specifically to an idler wheel assembly for use with an endless belt which includes a resilient tire and a rim. The resilient tire includes a central rib, at least one guide groove, and at least one load bearing surface. The rim includes means for releasably securing the tire thereto and means for attachment of the idler wheel assembly to an axle.

There have been numerous proposals and various constructions of idler wheels used with endless track vehicles and endless belt conveyors. The most common type of idler wheel is one which is positioned between sprockets defining the ends of an endless belt arrangement. This type of idler wheel is normally not concerned with lateral displacement of the belt relative thereto because of the control exercised by the drive sprockets and the idler sprockets. More recently there have been idler wheels which have a particular configuration for conforming to and use with a track of a particular configuration. An example of such an idler wheel, depicted in FIG. 2 of U.S. Pat. No. 4,906,054, shows an idler wheel which includes a large groove generally centered around the circumference of the wheel for cooperation with a ridge on the inside of an endless track. The alignment of an idler wheel of this type of arrangement with the endless track, as long as the endless track is properly tensioned therearound, results because of the engagement of the sides of the groove with the sides of the raised ridge on the inside of the endless track. Another example of a known idler wheel configuration, depicted in U.S. Pat. No. 4,241,956, shows idler wheels 14 and forward end track rollers 24 with elastomeric surfaces. Yet another example, shown in U.S. Pat. No. 3,738,714, includes a plurality of tread supporting wheels 64 and 80 cooperating with a drive sprocket and rails 200 for guiding of an endless belt. And yet another idler wheel arrangement, depicted in U.S. Pat. No. 3,451,728, cooperates with an endless track which has protrusions 27, and a similar arrangement, depicted in U.S. Pat. No. 2,992,862, incorporates idler wheels 35. Clearly, as will become more apparent after an understanding of the instant invention, none of the prior art idler wheels anticipate the idler wheel assembly as taught by the instant invention.

SUMMARY OF THE INVENTION

According to the present invention, an idler wheel assembly includes a resilient tire of a particular configuration and a rim having an inner cylindrical portion functioning as a hub for the attachment of the idler wheel assembly to an axle and an outer cylindrical portion for supporting the resilient tire. The resilient tire is removably mounted on the rim and includes a centrally disposed rib with guide grooves on either side thereof and load bearing surfaces disposed laterally outwardly of each guide groove. The centrally disposed rib is of a slightly larger diameter than the portion of the tire defined by the load bearing surfaces and includes angled side walls which also form the inner-most side walls of the guide groove formed on either side thereof. The particular configuration of the idler wheel assembly is such that, when the assembly is used with an endless belt, which has serially spaced openings therein, the idler wheel assembly tends to be self-centering relative to the endless belt when there are few if any lateral stresses applied thereto. The configuration of the idler wheel assembly further provides for limiting of lateral displacement of the endless belt relative thereto, when the endless belt has spaced protrusions extending generally perpendicularly from an inner surface thereof, by guide grooves providing two areas of engagement with protrusions on the inside of the belt when there are more significant lateral stresses applied thereto.

The idler wheel assembly of the instant invention is particularly well suited for use with an endless track used as the drive means for a skid steer vehicle. In this environment, the resilient tire, when made of urethane and of a thickness approaching about one-half the overall diameter of the assembly, is excellent for shock absorption and thereby provides a much improved ride for the user. The idler wheel assembly is also much more safe because of its providing better stability and thereby better control of the vehicle. An endless track properly tensioned around an idler wheel assembly, constructed in accordance with the present invention and used on a skid steer vehicle, will support the endless track relative to the vehicle and remain in proper alignment with the idler wheel assembly because of the configuration of the resilient tire and the manner in which it cooperates with the inside of the endless track.

Accordingly, it is an object of the present invention to provide for a continuing engagement of an idler wheel assembly with the inside of an endless belt properly tensioned there around.

It is another object of this invention to provide an idler wheel assembly which tends to be self-centering relative to an endless belt which has serially spaced apertures therein.

It is also an object of the instant invention to provide an idler wheel assembly which engages protrusions on an endless belt with guide grooves to preclude misalignment of the endless belt relative thereto.

It is yet another object of this invention to provide an idler wheel assembly which is capable of absorbing shock to thereby limit the amount of shock transferred to an axle on which the idler wheel assembly is mounted.

It is also an object of this invention to provide an idler wheel assembly which overcomes the problems in the prior art and which is efficient and economical in construction.

Other objects and advantages of the present invention will be apparent and understood from the following detailed description when taken in conjunction with the accompanying drawings.

DETAILED DESCRIPTION OF THE PREFERRED EMBODIMENT

Figure 1:
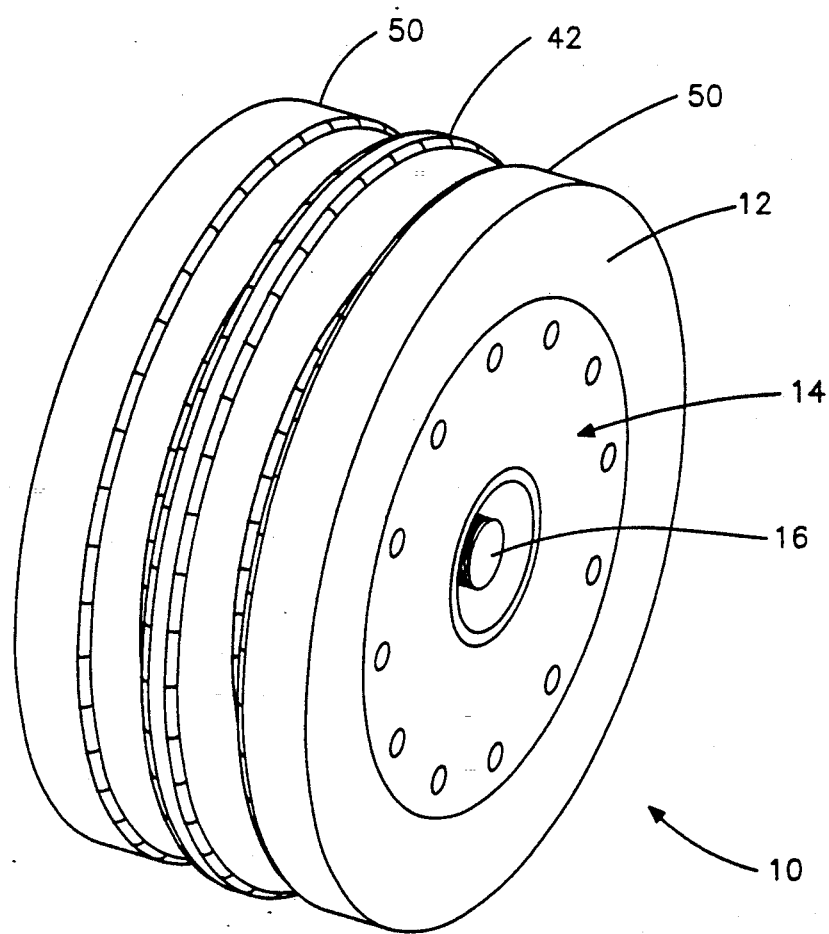
FIG. 1 is a perspective view of an idler wheel assembly constructed in accordance with the instant invention.
Figure 5:
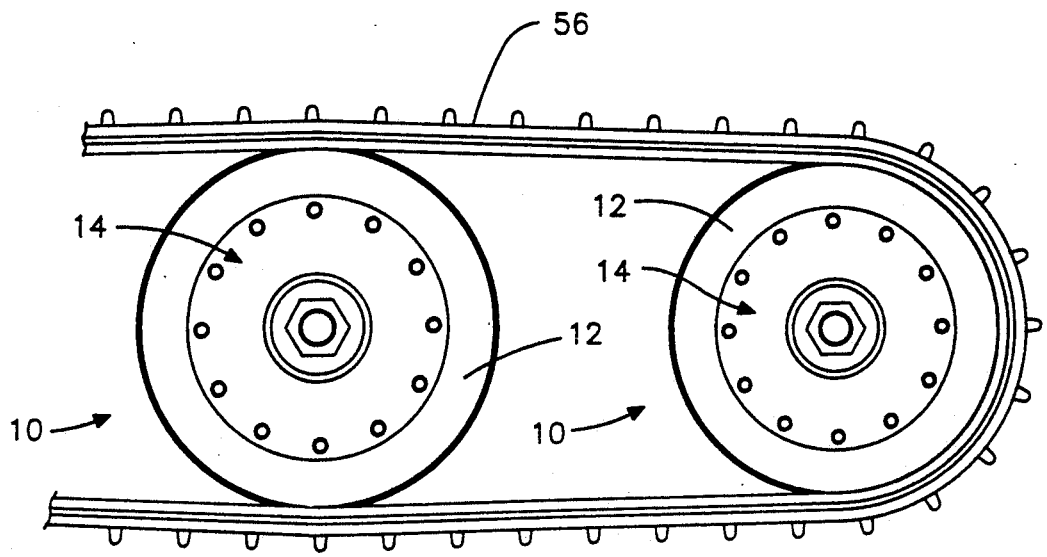
FIG. 5 shows a pair of idler wheel assemblies relative to a portion of an endless belt.
Figure 3:
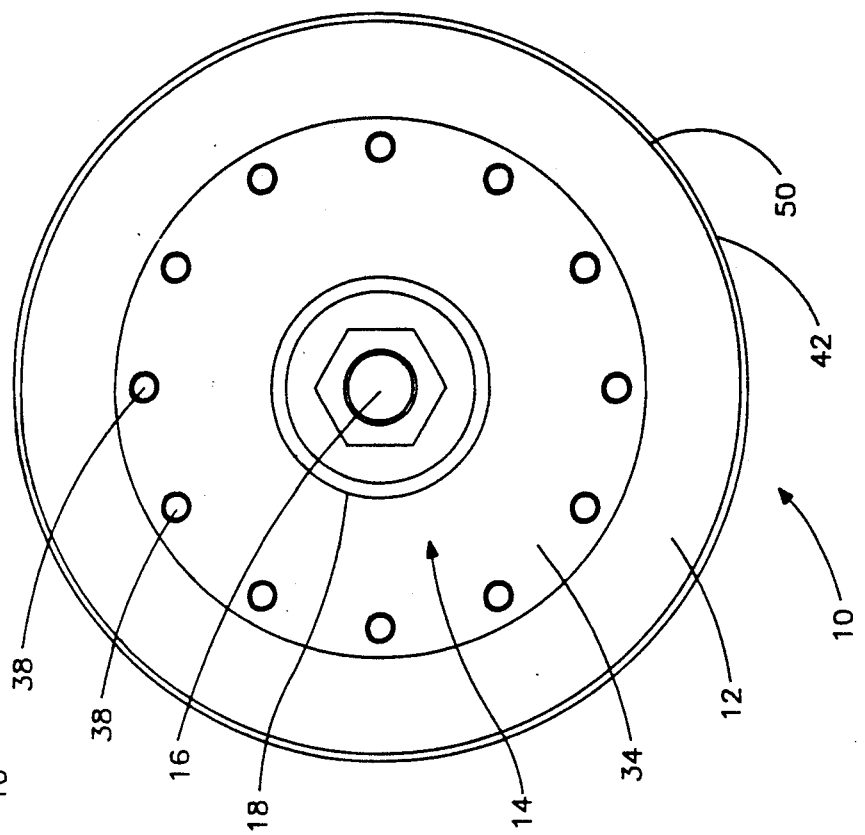
FIG. 3 is a view of the outer side of the idler wheel assembly depicted in FIG. 1.

Reference herein below is made to the drawings wherein like reference numerals have been employed to designate the same or similar components throughout the various views.

Figure 2:
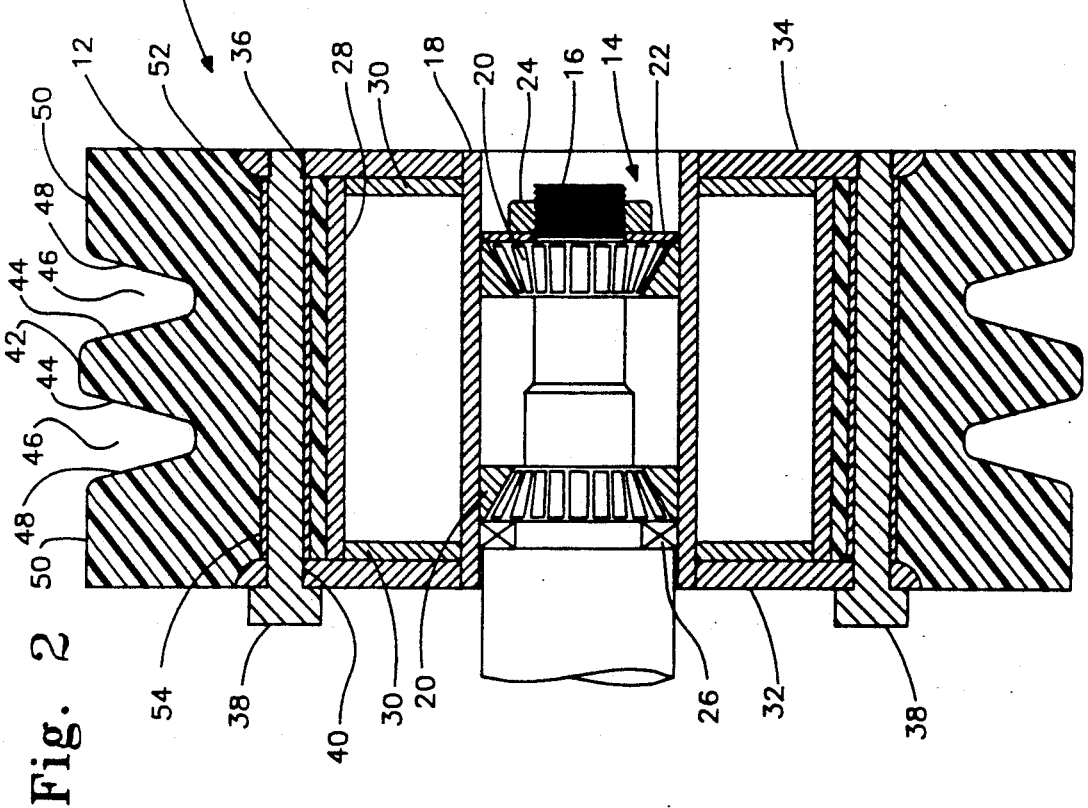
FIG. 2 is a cross-sectional view of the idler wheel assembly depicted in FIG. 1.

Referring now to FIG. 1, idler wheel assembly 10 includes a resilient tire 12 and a rim 14 mounted on an axle 16. As best seen in FIG. 2, rim 14 includes an inner cylinder 18 adapted to mount idler wheel assembly 10 on axle 16 using bearings 20 in conjunction with a washer 22 and a nut 24 engaged on threads on axle 16. A grease seal 26 is utilized to contain grease within the bearing area and an end cap (not shown) can be utilized to maintain grease within the bearing area at the outer end of axle 16. An outer cylinder 28 is maintained in spaced relationship to inner cylinder 18 by spacer discs 30. Inner clamping plate 32 is positioned over the end of the inner cylinder 18 and secured thereto. As is evident from FIG. 2, inner cylinder 18 has an overall length which is less than the overall length of outer cylinder 28. Preferably the length of inner cylinder 18 is equal to the length of the outer cylinder 28 plus the thickness of the clamping plates 32 and 34. Ideally, the inner cylinder 18, spacers 30, outer cylinder 28, and inner clamping plate 32 are welded to form a unitary assembly. Outer clamping plate 34 includes threaded bores 36 for receiving threaded ends of bolts 38 and inner clamping plate 32 includes bores 40 for receiving bolts 38 therethrough, the reasons for which will be more clearly understood later.

Resilient tire 12 is formed of a resilient durable material and preferably is formed of urethane. Tire 12 includes a centrally disposed rib 42 with angled opposite side walls 44 which also form the inner walls of guide grooves 46. Guide grooves 46 are disposed on either side of the central rib 42 and include angled outside walls 48. Load bearing surfaces 50 are disposed laterally outside each respective guide groove 46. Load bearing surfaces 50 are generally perpendicular to a central plane passing through the central rib 42 and walls 44 and 48 are angled generally 75 degrees relative to the load bearing surfaces 50. Bores 52 extend transversely through the resilient tire 12 and are sized to receive rigid spacer sleeves 54 which in turn receive bolts 38 therethrough. Resilient tire 12 is just under one-half of the total diameter of the idler wheel assembly 10 thereby providing substantial cushioning of shocks received by the assembly.

To assemble the idler wheel assembly 10, first the resilient tire 12 is slipped over the outer cylinder 18 of rim 14 until it abuts the inner clamping plate 32. Spacer sleeves 54 are inserted into bores 52 and then outer clamping plate 34 is positioned such that bolts 38 can be inserted through the bores in the inner clamping plate 32, through the spacer sleeves 54, and threaded into the threaded bores 36 in the outer clamping plate. Bolts 38 can then be tightened without compression of the resilient tire, which would cause a loss of some of the inherent properties of the material used, e.g., the overall resiliency of the tire, because of the spacer sleeves 54. It should be noted that the side walls of the resilient tire have recesses therein such that the clamping plates are generally flush with the respective sidewall thereby presenting an overall generally smooth side wall for the idler wheel assembly.

Figure 4:
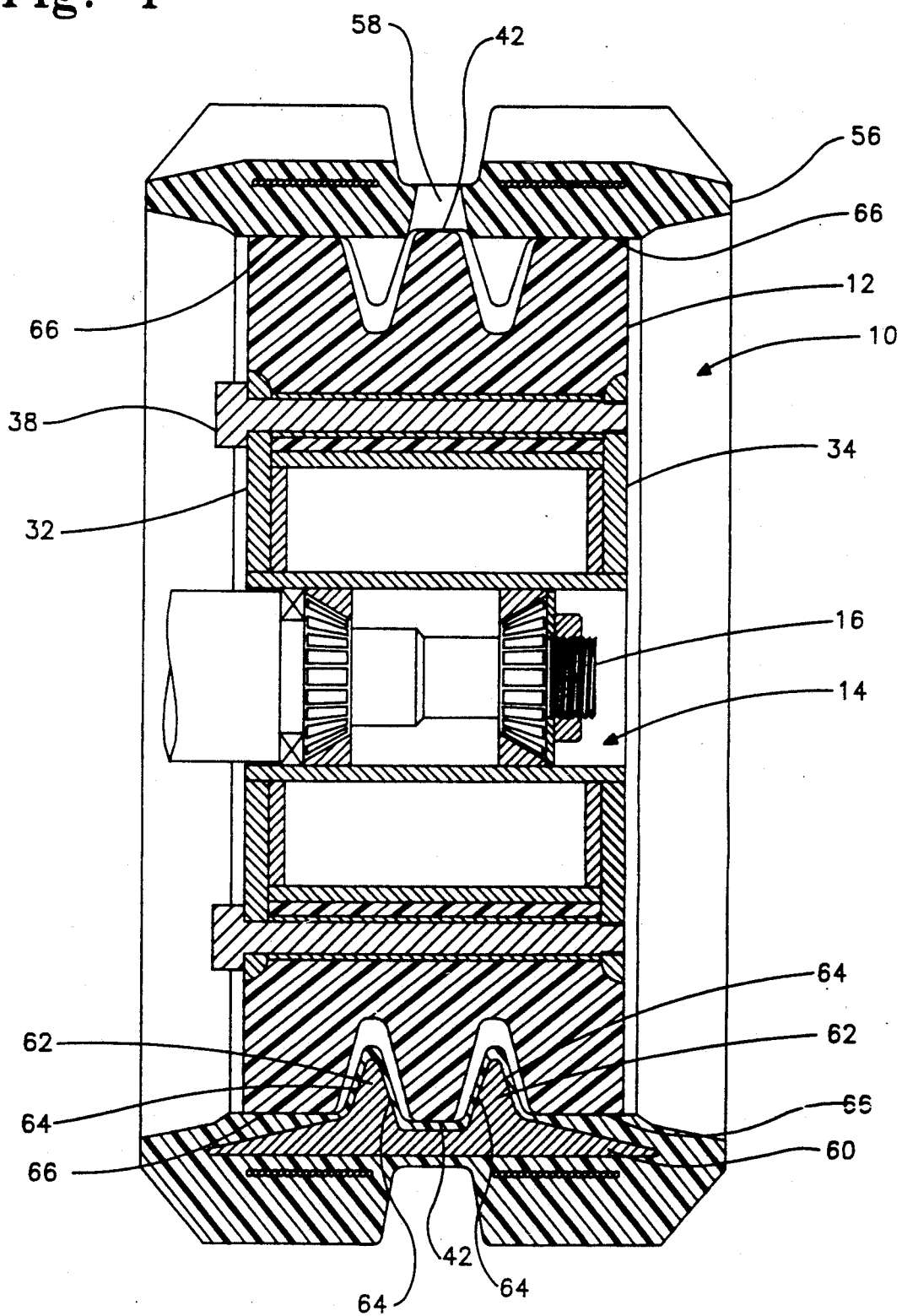
FIG. 4 is a cross-sectional view showing the idler wheel assembly relative to an endless belt.

Referring now to FIG. 4, the idler wheel assembly is shown relative to an endless belt 56 having serially spaced apertures 58 therein and transversely extending reinforcing elements 60 which are embedded in the endless belt at the time of construction. Reinforcing elements 60 are disposed between adjacent apertures 58 which extend down the center of the endless belt and include protrusions 62 which extend generally perpendicular from the inside of the endless belt. Protrusions 62 are generally shaped like inverted V's and include side walls 64 which are generally at about 75 degrees relative to surfaces 66 which are disposed on either side of the protrusions. Surfaces 66 are adapted for engagement by the load bearing surfaces 50 of the idler wheel assembly and, accordingly, the weight of the vehicle is transferred by way of axle 6 to the idler wheel assembly 10 and then is transferred to the endless belt 56 through the engagement of load bearing surfaces 50 with surfaces 66.

Centrally disposed rib 42 is of a slightly larger diameter than the portion of resilient tire 12 which is defined by the load bearing surfaces 50. Rib 42 is not compressed in the area of apertures 58 (best seen in the upper portion of FIG. 4) and is slightly compressed in the area where there are no apertures (best seen in the lower portion of FIG. 4). This creates a built in bias in the resilient tire 12, when there are few lateral stresses being exerted thereon, which tends to center the idler wheel assembly 10 relative to the endless belt 56 due to the tendency of the central rib 42 to seek the apertures 58 wherein the rib 42 is in a relaxed condition. In extreme situations where lateral stresses are tending to displace the endless belt 56 laterally relative to the idler wheel assembly 10, and the central ribs, tendency to selfcenter with the apertures 58 is insufficient to maintain alignment, than the guide grooves 46 cooperate with the protrusions 62 to maintain proper alignment. The side walls 44 and 48 of the guide grooves 46 and the side walls 64 of the protrusions 62 are generally of the same angularity such that there is less wear when they are in engagement, i.e., 75 degrees relative to the load bearing surfaces 50. The engagement of both guide grooves 46 with spaced protrusions 62, as the idler wheel assembly 10 rotates relative to endless belt 56, limits lateral displacement of the endless belt and maintains the idler wheel assembly 10 relative to the endless belt 56 in a predetermined manner.

While this invention has been described with a certain degree of particularity, it is manifest that many changes may be made in the details of construction and in the arrangement of components without departing from the spirit and scope of the disclosure. It is understood that the invention is not limited to the embodiment set forth herein for purposes of exemplification, but it is limited only by the scope of the attached claims, including the full range of equivalency to which each element thereof is entitled.

What is claimed is:

1. An idler wheel assembly comprising rim means and resilient tire means; said rim means including an inner cylinder means having means for mounting said idler wheel assembly on an axle, outer cylinder means maintained in spaced relation to said inner cylinder means by spacer means, and means for releasably securing said resilient tire means to said rim means; said resilient tire means including rib means, load bearing surface means disposed on each side of said rib means, and guide groove means disposed between said load bearing surface means disposed on each side of said rib means and said rib means; said resilient tire means being constructed of material having the ability to absorb shocks and thereby limit the transmission of shocks to said axle.

2. An idler wheel assembly as set forth in claim 1 wherein said load bearing surface means includes load bearing surfaces extending substantially perpendicular to a central plane of said rib means.

3. An idler wheel assembly as set forth in claim 2 wherein said rib means has angled side walls disposed at substantially 75 degrees relative to said load bearing surfaces.

4. An idler wheel assembly as set forth in claim 3 wherein the radially extending thickness of said resilient tire means is generally about one-half of the overall diameter of said rim means.

5. An idler wheel assembly as set forth in claim 4 wherein said guide groove means includes angled outer side walls disposed generally at 75 degrees relative to said load bearing surfaces.

6. An idler wheel assembly as set forth in claim 2 wherein said clamping means includes a first clamping plate fixed to said outer cylinder and a second cylinder plate releasably secured to said first clamping plate by bolts, said first clamping plate and said resilient tire means including bores for receiving said bolts therethrough, whereby said idler wheel assembly is assembled with said bolts extending through said bores in said first clamping plate and said resilient tire means and secured to said second clamping plate thereby releasably securing said resilient tire means to said rim means.

7. An idler wheel assembly as set forth in claim 6 wherein said second clamping plate includes threaded bores for receiving threaded ends of said bolts and said resilient tire means includes spacer sleeves disposed in the bores therein for precluding compression of said resilient tire means by said clamping plates.

8. An idler wheel assembly as set forth in claim 7 wherein said resilient tire means includes opposite side walls having recesses therein for receiving a respective clamping plate therein whereby a generally smooth side wall is presented.

9. An idler wheel assembly as set forth in claim 1 wherein said rib means is of a diameter which is larger than an outside diameter of said load bearing surface means.

10. An idler wheel assembly for endless belt means comprising rim means and resilient tire means; said resilient tire means including rib means, circumferentially disposed load bearing surface means disposed on each side of said rib means, and guide groove means disposed between said load bearing surface means disposed on each side of said rib means and said rib means; said endless belt means including transverse reinforcing means and at least one surface on an inside thereof for engagement by the load bearing surface means of said tire means; said rim means including an inner cylinder means having means for mounting said idler wheel assembly on an axle, outer cylinder means for supporting said resilient tire means maintained in spaced relation to said inner cylinder means by spacer means, and clamping means for releasably securing said resilient tire means to said rim means; said transverse reinforcing means of said endless belt means including protrusions extending generally perpendicular to said at least one surface on the inside thereof; said resilient tire means being constructed of material capable of absorbing shocks to thereby limit the transmission of shocks to said axle and said guide groove means cooperating with said protrusions for maintaining said endless belt means relative to said idler wheel assembly when said belt means is tensioned therearound.

11. An idler wheel assembly as set forth in claim 10 wherein said protrusions on said endless belt include two rows of protrusions wherein each row of protrusions is alignable with a respective guide groove means.

12. An idler wheel assembly as set forth in claim 10 wherein said load bearing surface means includes load bearing surfaces extending substantially perpendicular to a central plane of said rib means and said endless belt is of a width which is wider than the width of said wheel assembly.

13. An idler wheel assembly as set forth in claim 12 wherein said rib means has angled side walls disposed at substantially 75 degrees relative to said load bearing surfaces.

14. An idler wheel assembly as set forth in claim 13 wherein the radially extending thickness of said resilient tire means is generally about one-half of the overall diameter of said rim means.

15. An idler wheel assembly as set forth in claim 14 wherein said guide groove means includes angled outer side walls disposed at generally 75 degrees relative to said load bearing surfaces.

16. An idler wheel assembly as set forth in claim 15 wherein said clamping means includes a first clamping plate fixed to said outer cylinder and a second clamping plate releasably secured to said first clamping plate by bolts, said first clamping plate and said resilient tire means including bores for receiving said bolts therethrough, whereby said idler wheel assembly is assembled with said bolts extending through said bores in said first clamping plate and said resilient tire means and secured to said second clamping plate thereby releasably securing said resilient tire means to said rim means.

17. An idler wheel assembly as set forth in claim 16 wherein said first clamping plate includes threaded bores for receiving threaded ends of said bolts and said resilient tire means includes spacer sleeves disposed in the bores therein for precluding compression of said resilient tire means by said clamping plates.

18. An idler wheel assembly as set forth in claim 17 wherein said resilient tire means includes opposite side walls having recesses therein for receiving a respective clamping plate therein whereby a generally smooth side wall is presented.

19. An idler wheel assembly as set forth in claim 12 wherein said rib means is of a diameter which is larger than an outside diameter of said load bearing surface means.

* * * * *